(12) United States Patent
Thorne

(10) Patent No.: US 8,739,460 B2
(45) Date of Patent: Jun. 3, 2014

(54) INTERCHANGEABLE BLADE AND LURE FISHING ASSEMBLY

(76) Inventor: David L. Thorne, Kaysville, UT (US)

( * ) Notice: Subject to any disclaimer, the term of this patent is extended or adjusted under 35 U.S.C. 154(b) by 374 days.

(21) Appl. No.: 13/200,900

(22) Filed: Oct. 4, 2011

(65) Prior Publication Data

US 2012/0023805 A1 Feb. 2, 2012

Related U.S. Application Data

(63) Continuation-in-part of application No. 12/387,024, filed on Apr. 27, 2009, now abandoned, which is a continuation-in-part of application No. 11/656,099, filed on Jan. 22, 2007, now abandoned.

(51) Int. Cl.
*A01K 85/00* (2006.01)
*A01K 85/18* (2006.01)
*A01K 85/16* (2006.01)
*A01K 85/14* (2006.01)
*A01K 85/12* (2006.01)

(52) U.S. Cl.
CPC ................ *A01K 85/18* (2013.01); *A01K 85/16* (2013.01); *A01K 85/00* (2013.01); *A01K 85/14* (2013.01); *A01K 85/12* (2013.01)
USPC ........................................................ 43/42.15

(58) Field of Classification Search
CPC ....... A01K 85/18; A01K 85/16; A01K 85/00; A01K 85/12; A01K 85/14
USPC .................... 43/42.29, 42, 42.5, 42.35, 42.11
See application file for complete search history.

(56) References Cited

U.S. PATENT DOCUMENTS

| 4,453,333 | A | * | 6/1984 | Olson | ............................. | 43/42.5 |
| 5,857,283 | A | * | 1/1999 | Perrick | .......................... | 43/42.5 |
| 7,726,062 | B2 | * | 6/2010 | Davis | ........................... | 43/42.15 |
| 2005/0210731 | A1 | * | 9/2005 | Davis | ................................ | 43/42 |

\* cited by examiner

*Primary Examiner* — Valentina Xavier

(57) ABSTRACT

A fishing lure combination is disclosed which comprises a frame and an oscillating blade which may be affixed to the frame and then replaced without removing or untying a fishing line affixed to the frame. Also, the frame comprises a clip for replacing an associated weighted fishing lure, also without removing or untying the fishing line.

4 Claims, 2 Drawing Sheets

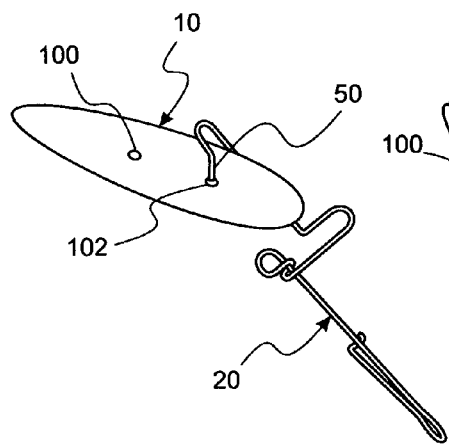
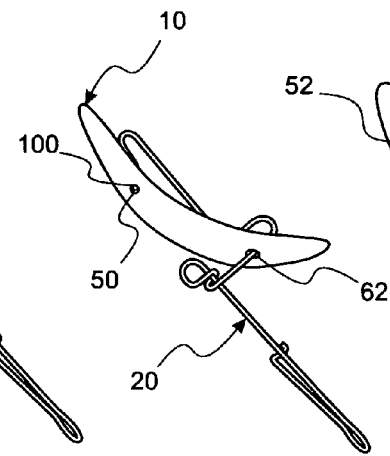
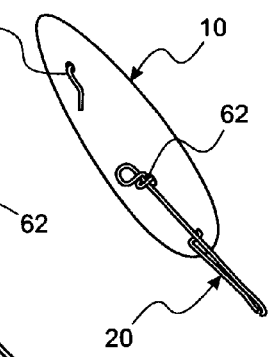
FIGURE 5  FIGURE 6  FIGURE 7
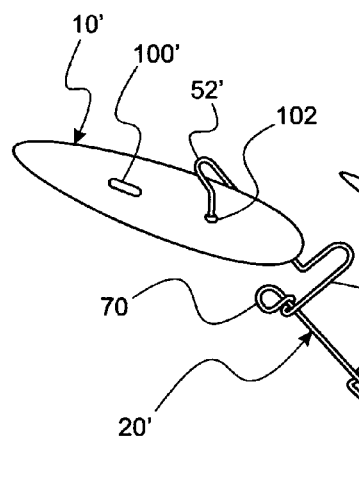
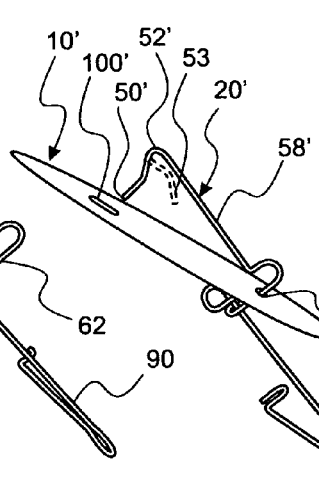
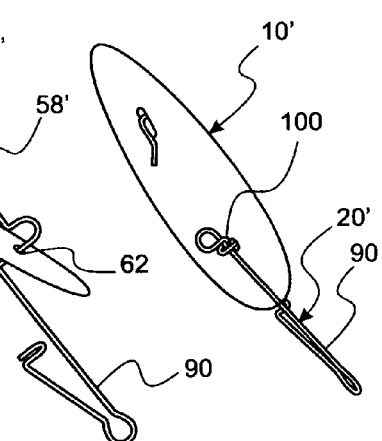
FIGURE 8  FIGURE 9  FIGURE 10

INTERCHANGEABLE BLADE AND LURE FISHING ASSEMBLY

CONTINUITY

This application is a Continuation-in-Part of U.S. patent application Ser. No. 12/387,024 titled BLADED FISHING LURE ASSEMBLY and filed Apr. 27, 2009 which is a Continuation-in-Part of U.S. patent application Ser. No. 11/656,099, titled FISHING LURE ASSEMBLY and filed Jan. 22, 2007 all by David L. Thorne, which are made part hereof by reference.

FIELD OF INVENTION

This invention relates to blades and frame assemblies from which fishing lures or other fishing gear may be constructed, and particularly assemblies which comprise an oscillating blade affixed to a frame which is further affixed to a fishing line and a lure,

BACKGROUND AND RELATED ART

Fishing lures for jigging are well known in fishing art. Such lures are generally made by casting or otherwise enveloping a shank of a hook with a weighted (usually metal) body. Examples of such lures are disclosed in U.S. Pat. No. 4,453,333 issued Jun. 12, 1984, to Robert W. Olson (Olson). Olson also discloses a generally convex blade to which a lure may be affixed to provide kite-like action of the blade as the lure is propelled through water. As shown in FIGS. 1-4, a weighted lure affixed to the blade derives a gentle swaying motion from the blade as the lure is retrieved through water.

A snag resistant fishing lure is disclosed in U.S. Pat. No. 7,726,062 B2, issued Jun. 1, 2010, to James Ronald Davis (Davis). Davis discloses a jig with an attached blade. The jig has a weight molded about the shank of a hook with an eyelet disposed to maintain the sharpened point of a hook held upright by the relative dispositions of the eyelet, weight and orientation of the point. The blade is taught to be affixed to the eyelet and be limited in oscillation by either collision of the blade with the eyelet or with the weight. Further, the blade is taught to comprise three holes, one of which is used to securely affix the blade to the eyelet. The other two holes are taught to be used in cooperation with a clip affixed to a fishing line for the purpose of releasibly affixing the fishing line of a fishing lure unit which comprises both blade and fishing lure.

While the prior U.S. Patent Application from which this U.S. Patent Application continues-in-part and U.S. Patents, such as Davis, concentrate upon lure motion as a primary objective for achieving a desired fishing lure, there are two additional factors which must be considered in measuring effectiveness of a bladed fishing lure. The first factor is color and color must be considered for both blade and lure. The second factor is how much precious fishing time is lost in interchanging blades and lures while experimenting to find a most useful blade/lure combination. Note that the blade/lure combination of Davis is not taught to comprise interchangeable parts. If a change is to be made, an entire lure must be disconnected from a fishing line and a totally new lure. Such a requirement, severely reduces the combination of blades and lures available within a fisherman's creel. As an example, for a given lure, a silver colored blade may be far more effective than a gold colored blade at given fishing moment. For this reason, it may be highly desirable to exchange blades without changing lures.

DEFINITIONS

For purposes of this disclosure, the following definitions apply:

blade, n, a broad flattened part which is affixed to a portion of a fishing lure and which oscillates (rather than rotates) as the lure is propelled in water to provide a wake following therefrom; such a blade may be rigid or flexible, if flexible such a blade requires a supporting mast to withstand pressure applied while being displaced through water distal, adj, (see also proximal) indicates the segment of a device normally away from a line attachment of a lure fishhook, n, a device, usually made of rigid metal wire, comprising a curved section which has a sharpened point on one end for catching a fish and a shank which comprises a substantially straight portion on an opposite end. Generally, the shank is ultimately affixed to an eyelet or other attachment providing for connecting line and other accouterments the fishhook fishing assembly, n, a combination blade, frame and lure part which provides a complete fishing lure, in this case, including an oscillating blade and a lure part inferior, adj, situated lower down or closer to the center of the earth than a referenced site lure part, n, generally, within the scope of this application, a weighted fishing lure, usually associated with a fishhook (e.g. a jig)

proximal, adj, indicates the segment of a device normally closely disposed relative to a line attachment of a lure superior, adj, situated higher up or away from the center of the earth relative to a referenced site

BRIEF SUMMARY AND OBJECTS OF THE INVENTION

In brief summary, this novel invention defines and specifies bases for blade and frame combinations which provide for rapidly changing blades and lures to maximize blade and lure replacement efficacy thereby permitting a fisherman to experiment for optimum lure color and other physical lure characteristics without undue loss of precious fishing time. Generally, the resulting combinations each comprise an arcuately wound frame from which an affixed blade may be displaced and replaced with a second blade without detaching the frame from the fishing line. The frame may also be securely, but releasibly affixed to a forward attachment site of a lure part inferiorly disposed relative to the blade. The site whereat the fishing line is affixed defines a first horizontal plane and the forward attachment site of the lure part is associated with a longitudinal axis of the lure. It should be noted that the blades are designed to oscillate rather than rotate. Generally, the lure is weighted to assure stability (with blade superiorly disposed) when being displaced through water.

Therefore, it is a primary object to provide a combination frame and blade assembly for a fishing lure wherein said frame remains securely affixed to a fishing line while one blade is replaced by another blade.

It is further an object to provide a frame comprising, at a free first end which is threaded through an inferiorly disposed hole in a blade whereby the blade is affixed to the frame, distal from the free end the frame, the frame comprising an arcuate bend to form a clasp whereby a fully installed blade with the frame threaded through a superiorly disposed hole is firmly grasped and held in place.

It is still further an object to provide an elongated section of the frame distal from the clasp, the elongated section ending in a series of arcuate bends which form a blade alignment and containment segment for the first hole followed by a loop by which fishing line is affixed to the frame;

It is yet a further object to provide a second elongated section, distal to the fishing line attachment loop which ends with a clip by which a fishing lure is securely but releasably affixed to the frame.

It is another primary object to provide an oscillating blade comprising two holes of sufficient size to permit threading the wire of the frame there through, the holes being sufficiently separated to permit one hole of said blade to be disposed along the alignment and containment segment while a superior section of the blade is grasped through the superior hole by the clasp to impede said blade from rotating.

It is an object to provide a blade made from material which is sufficiently flexible to permit threading of the frame through the holes yet being sufficiently rigid to fit within the grasp of the clasp when inserted therein.

It is also an object to provide a rigid blade and a flexible frame such that the frame may be deformed to permit threading the frame through the holes in the blade without bending the blade.

It is another object to provide a clip interface for a weighted lure, to be used with the frame and oscillating blade.

BRIEF DESCRIPTION OF THE DRAWINGS

FIG. 5 is a perspective wherein an end of the frame is seen in a step engaging an inferiorly disposed hole of the blade seen in FIG. 3.

FIG. 6 is a perspective of a step following the step in FIG. 5 wherein the blade, threaded onto the frame, is bent to permit the end of the frame to engage the superior hole in the blade.

FIG. 7 is a perspective of a fully engaged blade on the frame as the result of steps seen in FIGS. 5 and 6.

FIG. 8 is a perspective wherein an end of the frame is seen in a step engaging an inferiorly disposed hole of the blade seen in FIG. 4.

FIG. 9 is a perspective of a step following the step in FIG. 5 wherein the frame is bent to engage the superior hole in the blade.

FIG. 10 is a perspective of a fully engaged blade on the frame as the result of steps seen in FIGS. 8 and 9.

DETAILED DESCRIPTION OF THE ILLUSTRATED EMBODIMENTS

Reference is now made to the embodiments illustrated in FIGS. 1-10 wherein like numerals are used to designate like parts throughout. Primes of numbers, otherwise used without primes for designating a part, label parts which are similar in form and function, but not identical to those parts designated by the numbers without primes.

Figure 1:
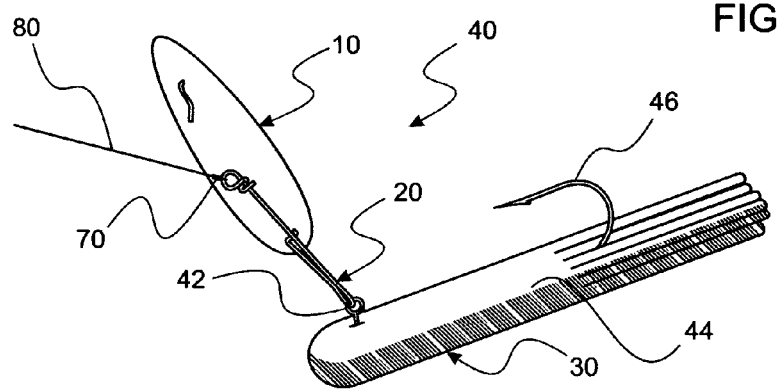
FIG. 1 is a perspective of a completed assembly comprising an oscillating blade affixed to a frame which is further affixed to a fishing lure which comprises a fishing hook.

Reference is now made to FIG. 1 wherein a combination blade 10 and frame 20 are affixed to a fishing lure 30 to form a complete fishing lure assembly 40. Generally, fishing lure 30 may be any of a number of weighted fishing lures having a connecting loop 42, most often affixed to a weight (not seen in FIG. 1 as the weight is covered by a lure body 44). Also, as seen in FIG. 1, a fish hook 46 is an integral part of fishing lure 30 and may be directly affixed to the weight although such is not necessary within the scope of the instant invention.

Figure 2:
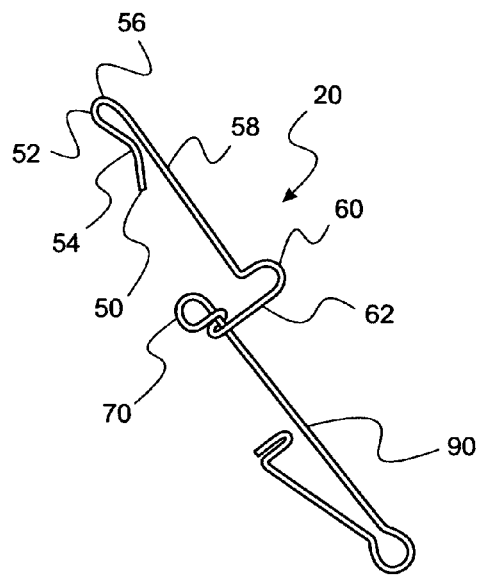
FIG. 2 is a side elevation of the frame seen in FIG. 1.

Frame 20 is more clearly seen in FIG. 2. Though frame 20 is sturdy, it may be made of wire which further may be formed from flexible material as disclosed hereafter. For frame 20, stainless steel wire is preferred. In a most superior section, frame 20 comprises a free end 50 from which a clasp 52 is formed by a series of arcuate bends 54 and 56. While a clasp may be formed by other means, clasp 52 is presently preferred due to its simplicity.

Frame 20 continues from clasp 52 through an elongated section 58 to a second arcuate bend 60 which provides a blade alignment and containment segment 62. Purpose of blade alignment and containment segment 62 is disclosed in detail hereafter. At the end of segment 62, the wire of frame 20 is wound upon itself to form a loop 70 whereat a fishing line 80 may be affixed (see FIG. 1).

Inferiorly disposed relative to loop 70, frame 20 continues to form an inferiorly disposed releasable clip 90. Forming such a clip, such as clip 90, is well known in fishing lure manufacturing art.

Figure 3:
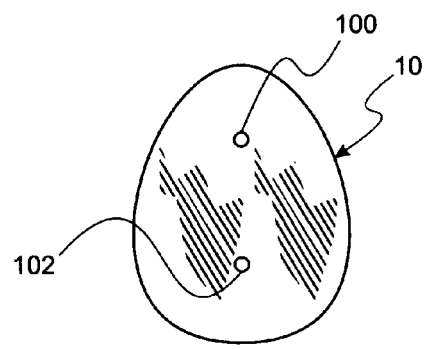
FIG. 3 is a flexible blade which comprises two holes by which the blade is affixed to the frame and constrained to oscillate.
Figure 4:
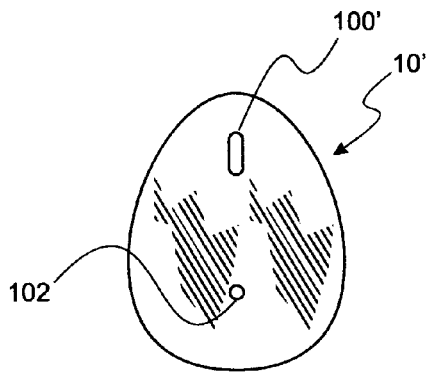
FIG. 4 is a blade which is similar to the flexible blade seen in FIG. 3, but comprises material making it rigid.

Blade 10 for assembly 40 requires but two holes, e.g. superiorly disposed hole 100 and an inferiorly disposed hole 102 as seen in FIG. 3. Generally, to affix blade 10 to frame 20, end 50 is first displaced through hole 102 as seen in FIG. 5. Blade 10 is then displaced until hole 102 is disposed upon segment 62, as seen in FIG. 6. Also, as seen in FIG. 6, blade 10 is bowed, until end 50 is displaced through hole 100. Note, it is important to selected a material for blade 10 which may be bowed.

Such material may be a synthetic resinous material such as polyvinyl chloride (PVC) or polyethylene or a metal such as beryllium copper. In any event such material must be able to be distorted in length and then have memory to return to an original shape, such that a fully affixed blade 10 is retained and restrained by clasp 52 and segment 62, as seen in FIG. 7. So affixed, blade 10 is free to oscillate as assembly 40 is displaced through water, but is fully restricted from spinning. Use of synthetic resinous material permits application of light reflecting surfaces, either by adhesive or hot stamping.

In some cases, it may be desirable to use blades which are inflexible. To accomplish this, a frame 20', similar to frame 20 seen in FIGS. 1-2 and 5-7 may be used. Such a frame 20' is seen in FIG. 8. The first stage of affixing blade 10' to frame 20', as seen in FIG. 8, is similar to that of affixing blade 10 to frame 20, see FIG. 5. Frame 20' comprises similar bends and segments to that of frame 20, including a clasp 52', a segment 62, fishing line loop 70 and clip 90. However, frame 20' must be sufficiently flexible to permit use of a rigid blade. For this purpose, frame 20' may comprise a flexible material such as Titanium to provide a distortable clasp 52' which is displaced for insertion of end 50' in an elongated hole 100'. Elongated hole 100' is better seen in FIG. 4. Note dashed line segment 53 indicates a rest state for clasp 52', when not displaced for blade attaching or detaching. Once blade 10' is fully affixed to frame 20', as seen in FIG. 10, clasp 52' is permitted to relax for containment of blade 10'.

Alternately, frame 20' may comprise bendable material in a segment 58', position of which is seen in FIG. 9. Note that segment 58' may be bent to displace end 50 rather than using a distortable clasp 20'.

Within the scope of the invention, frames may be formed differently than frame 40, but within the scope of the invention such forms should include geometry which permits a supporting mast to be inserted through holes in a blade to form the inventive combination which securely engages the blade to the frame once assembled thereto and permits disassembly without removing a attached fishing line from the frame.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for providing and using a combination frame and oscillating blade assembly in conjunction with a weighted fishing lure wherein said frame remains securely affixed to a fishing line while one oscillating blade is replaced by another oscillating blade, said method comprising the steps of:
   (a) providing a wire frame comprising, at a free first end which is threaded through an inferiorly disposed hole in an oscillating blade whereby the oscillating blade is affixed to the frame, distal from the free end the frame, the frame comprising an arcuate bend proximal to the first free end to form a clasp such that when the free end is threaded through a superiorly disposed hole in an oscillating blade, the oscillating blade is grasped and affixed to the frame while allowing side to side oscillatory motion;
   (b) further providing an elongated section of the frame distal from the clasp, the elongated section ending in a series of arcuate bends which form an oscillating blade alignment and containment segment followed distally by a first loop by which fishing line is affixed to the frame;
   (c) still further providing, distal to the first loop, a second elongated section which ends with a second fishing lure attachment loop by which a fishing lure is affixed to the frame; and
   (d) providing an oscillating blade comprising two holes of sufficient size to permit threading the wire of the frame there through, the holes having sufficient separation to permit one hole of said blade to be disposed along the alignment and containment segment while a superior section of the blade is grasped by the clasp to impede said blade from rotating, said oscillating blade comprising material which is sufficiently flexible to permit threading of the frame through the holes yet being sufficiently rigid to fit within the grasp of the clasp when inserted therein;
   (e) affixing a fishing line to the first loop;
   (f) threading the free first end of the frame through an inferiorly disposed first hole in the blade and displacing the blade until the first hole is disposed at the alignment and containment segment;
   (g) bending the blade and threading the first free end through the superiorly disposed hole and displacing hole and blade until disposed in the grasp of said clasp; and
   (h) affixing a weighted fishing lure to complete the assembly for fishing.

2. A method for providing and using a combination frame and oscillating blade assembly for a weighted fishing lure wherein said frame remains securely affixed to a fishing line while one oscillating blade is replaced by another oscillating blade according to claim 1 wherein said blade is removed by the following steps:
   (i) bending the blade to free the grasp of the clasp and further bending the blade to displace the free end from superiorly disposed hole;
   (j) displacing the oscillating blade until the first hole is freed from the frame;
   (k) providing a substitute oscillating blade having the same physical characteristics of the original blade, but having different desired visual characteristics;
   (l) repeating steps (f) and (g) to install the substitute oscillating blade without displacing the fishing line from the first loop.

3. A method for providing and using a combination frame and blade assembly for a fishing lure wherein said frame remains securely affixed to a fishing line while one blade is replaced by another blade according to claim 1 wherein said second loop comprises a fishing lure attachment clip.

4. A method for providing and using a combination frame and blade assembly for a weighted fishing lure wherein said frame remains securely affixed to a fishing line while one oscillating blade is replaced by another oscillating blade according to claim 1 wherein the second loop providing step comprises:
   (m) providing an openable clip by which a weighted fishing lure is securely, but releasibly affixed to the frame;
   (n) opening the clip;
   (o) removing the previously affixed weighted fishing lure and substituting another weighted fishing lure without displacing the fishing line from the first loop.

* * * * *